United States Patent
Lee et al.

(10) Patent No.: US 12,266,832 B2
(45) Date of Patent: Apr. 1, 2025

(54) METHOD OF DISTRIBUTING POWER IN FUEL CELL SYSTEM

(71) Applicants: Hyundai Motor Company, Seoul (KR); Kia Corporation, Seoul (KR)

(72) Inventors: Jae Gwang Lee, Seoul (KR); Soon Woo Kwon, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 427 days.

(21) Appl. No.: 17/961,487

(22) Filed: Oct. 6, 2022

(65) Prior Publication Data

US 2023/0155146 A1    May 18, 2023

(30) Foreign Application Priority Data

Nov. 18, 2021   (KR) .................. 10-2021-0159433

(51) Int. Cl.
*H01M 8/04537*    (2016.01)
*H01M 8/04664*    (2016.01)

(52) U.S. Cl.
CPC ... *H01M 8/04619* (2013.01); *H01M 8/04679* (2013.01); *H01M 2250/20* (2013.01)

(58) Field of Classification Search
CPC ............. H01M 8/249; H01M 8/04619; H01M 8/04679; H01M 8/0494
See application file for complete search history.

(56) References Cited

U.S. PATENT DOCUMENTS

| | | | | |
|---|---|---|---|---|
| 2006/0257696 A1* | 11/2006 | Sridhar | ............. | H01M 8/04753 429/495 |
| 2008/0107933 A1* | 5/2008 | Gallagher | ......... | H01M 8/04753 429/432 |
| 2014/0089055 A1* | 3/2014 | Smith | ............... | H01M 8/04619 429/430 |
| 2018/0166719 A1* | 6/2018 | Kwon | ............... | H01M 8/04529 |
| 2020/0144652 A1* | 5/2020 | Ito | ....................... | H01M 8/0488 |

FOREIGN PATENT DOCUMENTS

KR   10-2018-0067740 A   6/2018
KR   10-2018-0069940 A   6/2018

* cited by examiner

*Primary Examiner* — Brittany L Raymond
(74) *Attorney, Agent, or Firm* — Morgan, Lewis & Bockius LLP

(57) ABSTRACT

A method of distributing power in a fuel cell system including a plurality of fuel cell stacks, includes determining, by a controller, a total system power demand, which is a power demand of the fuel cell system, determining an operation order of the fuel cell stacks based on a state of the fuel cell stacks, determining the number of operation fuel cell stacks among the plurality of fuel cell stacks based on the total system power demand and an average available power of the fuel cell stacks, determining operation target fuel cell stacks based on the operation order of the fuel cell stacks and the number of operation fuel cell stacks, and determining a power demand of each of the operation target fuel cell stacks based on the total system power demand and an effective catalyst reaction area ratio of each fuel cell stack included in the operation target fuel cell stacks.

20 Claims, 2 Drawing Sheets

METHOD OF DISTRIBUTING POWER IN FUEL CELL SYSTEM

CROSS-REFERENCE TO RELATED APPLICATION

The present application claims priority to Korean Patent Application No. 10-2021-0159433, filed on Nov. 18, 2021, the entire contents of which is incorporated herein for all purposes by this reference.

BACKGROUND OF THE PRESENT DISCLOSURE

Field of the Present Disclosure

The present disclosure relates to a method of distributing power in a fuel cell system, and particularly, to a method of distributing power in a fuel cell system for efficiently distributing power demand to fuel cell stacks forming the fuel cell system.

Description of Related Art

A fuel cell system is a kind of power generation system that converts chemical energy of fuel into electrical energy in a fuel cell stack.

Generally, a fuel cell system includes a fuel cell stack configured to generate electrical energy, a hydrogen supply device configured to supply hydrogen as fuel to the fuel cell stack, and an air supply device configured to supply air, which is an oxidizing agent for electrochemical reaction, to the fuel cell stack.

A conventional fuel cell system includes a plurality of fuel cell stacks. Upon receiving a request to output electrical energy, the fuel cell system divides the total power demand for the fuel cell stacks by the number of fuel cell stacks to evenly distribute the same to all of the fuel cell stacks, and each fuel cell stack is operated to output the distributed power.

However, when a first stack, which is a fuel cell stack in which an irreversible failure occurs, is found among the fuel cell stacks in the fuel cell system, the first stack outputs less power than the distributed power, reducing the total output of the fuel cell system.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of distributing power in a fuel cell system, which is a method of efficiently distributing power demand to each of fuel cell stacks based on the state of each of the fuel cell stacks.

The objects of the present disclosure are not limited to the above-mentioned object, and other objects of the present disclosure not mentioned herein may be understood based on the following description, and may be understood more clearly through the exemplary embodiments of the present disclosure. Furthermore, the object of the present disclosure may be realized by means indicated in the claims and combinations thereof.

Various aspects of the present disclosure are directed to providing a method of distributing power in a fuel cell system including a plurality of fuel cell stacks, the method including determining, by a controller, a total system power demand, which is a power demand of the fuel cell system, determining, by the controller, an operation order of the fuel cell stacks based on state of the fuel cell stacks, determining, by the controller, the number of operation fuel cell stacks, which is the number of fuel cell stacks to be operated, among the plurality of fuel cell stacks, based on the total system power demand the average available power of the fuel cell stacks, determining, by the controller, operation target fuel cell stacks, which are fuel cell stacks to which the total system power demand is to be distributed, based on the operation order of the fuel cell stacks and the number of the operation fuel cell stacks, and determining, by the controller, a power demand of each of the operation target fuel cell stacks based on the total system power demand and an effective catalyst reaction area ratio of each fuel cell stack included in the operation target fuel cell stacks.

In an exemplary embodiment of the present disclosure, when a fuel cell stack with irreversible failure is found among the plurality of fuel cell stacks while the operation target fuel cell stacks are operating, the controller may stop the operation of the fuel cell stack with the irreversible failure, determine the fuel cell stack having the highest operation priority among the remaining fuel cell stacks to be an alternative operation stack, and operate the alternative operation fuel cell stack. Here, the remaining fuel cell stacks may be stacks other than the operation target fuel cell stacks among all of the fuel cell stacks. The controller may distribute the power demand of the fuel cell stack with the irreversible failure to the alternative operation fuel cell stack. Furthermore, the fuel cell stack with the irreversible failure may be a fuel cell stack having an effective catalyst loading amount ratio equal to or less than a predetermined first loading amount ratio, among the operation target fuel cell stacks.

In another exemplary embodiment of the present disclosure, when a fuel cell stack with irreversible failure is found among the plurality of fuel cell stacks while the operation target fuel cell stacks are operating, the controller may stop the operation of the fuel cell stack with the irreversible failure and increase the individual power demand of remaining fuel cell stacks. Here, the remaining fuel cell stacks may be fuel cell stacks other than the fuel cell stack with the irreversible failure, among the operation target fuel cell stacks.

In various exemplary embodiments of the present disclosure, when a fuel cell stack with irreversible failure is found among the plurality of fuel cell stacks while the operation target fuel cell stacks are operating, the controller may reduce the power demand of the fuel cell stack with the irreversible failure to a predetermined minimum power demand and increase the individual power demand of remaining fuel cell stacks to a predetermined maximum power demand. Here, the remaining fuel cell stacks may be fuel cell stacks other than the fuel cell stack with the irreversible failure, among the operation target fuel cell stacks.

In various exemplary embodiments of the present disclosure, the controller may be configured to determine the operation order of each fuel cell stack based on a first weight factor and a second weight factor. Here, the first weight factor may be determined based on a hydrogen concentration in the fuel cell stack, and the second weight factor may be determined as a value obtained by dividing an effective catalyst reaction area ratio of the fuel cell stack by a total effective catalyst reaction area ratio of the fuel cell system. Furthermore, the controller may be configured to determine the operation order of the fuel cell stacks in order from the largest value to the smallest value of a total weight factor, which is a value obtained by multiplying the first weight factor by the second weight factor.

In still various exemplary embodiments of the present disclosure, the controller may be configured to determine individual power demand of the fuel cell stacks included in the operation target fuel cell stacks as a value obtained by multiplying a third weight factor of each fuel cell stack by the total system power demand. Here, the third weight factor may be determined as a value obtained by dividing the effective catalyst reaction area ratio of each fuel cell stack included in the operation target fuel cell stacks by a total effective catalyst reaction area ratio of the operation target fuel cell stacks.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
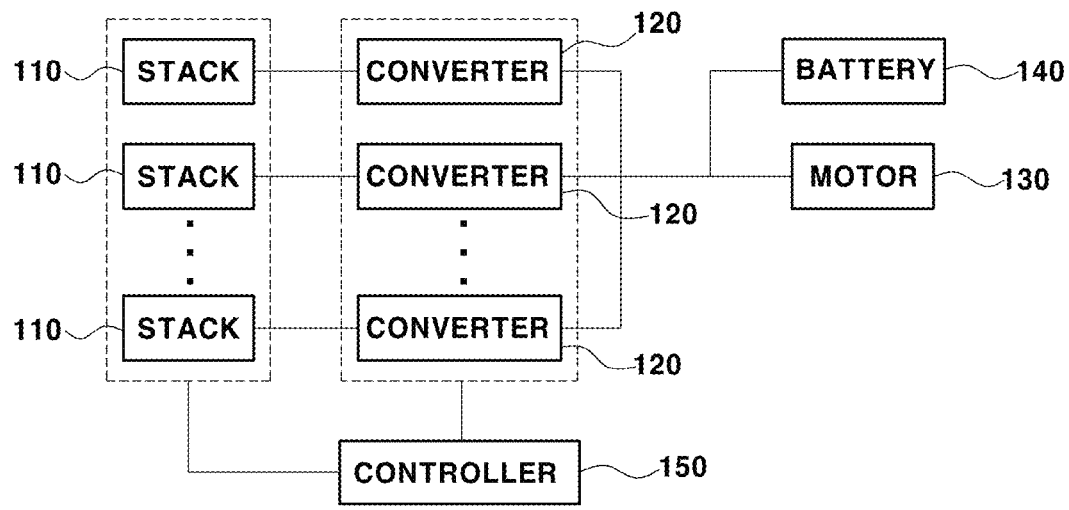
FIG. 1 is a block diagram showing a system configured to implement a method of distributing power in a fuel cell system according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described with reference to the accompanying drawings. The matters described in the appended drawings may be different from those actually implemented to facilitate description of the exemplary embodiments of the present disclosure.

Throughout the specification, when an element is referred to as "including" another element, it means that the element may include other elements as well, rather than excluding other elements, unless specifically stated otherwise.

It will be understood that, although the terms "first", "second", etc. may be used herein to describe various similar elements, these elements may not be construed to be limited by these terms. These terms are only used to distinguish one element from another.

A fuel cell system for a vehicle according to various exemplary embodiments of the present disclosure includes a plurality of fuel cell stacks 110. As shown in FIG. 1, each fuel cell stack 110 is connected to supply power to a motor 130. The motor 130 is a device configured to generate a travelling driving force for a vehicle, and is operated using power received from the fuel cell stacks 110.

Each fuel cell stack 110 may be connected to the motor 130 via a corresponding one of converters 120, and the converters 120 may control the current and voltage received from the fuel cell stacks 110 and may supply the current and voltage to the motor 130. Power remaining after being used by the motor 130 is charged in a battery 140.

An inverter may be provided between the converter 120 and the motor 130. The inverter converts a direct-current (DC) voltage transmitted from the converter 120 into an alternating-current (AC) voltage and transmits the same to the motor 130. Furthermore, a power converter may be provided between the converter 120 and the battery 140.

Each fuel cell stack 110 in the fuel cell system may be connected to a corresponding one of the converters 120. Each of the converters 120 may control the amount of power generation (i.e., available power) of the fuel cell stack 110 according to a command from a controller 150. The available power means power generated and output in real time by the fuel cell stack 110.

The controller 150 may generate a difference in the available power of the fuel cell stacks 110 by individually controlling the voltage and current of the fuel cell stacks 110 through the respective converters 120, and the controller 150 may selectively operate at least some of the fuel cell stacks 110 in the fuel cell system.

As the converter 120, a fuel cell DC-DC converter (FDC), which is generally mounted in a fuel cell vehicle, may be used. The controller 150 may be any one selected among the controllers mounted in the vehicle, or may be a combination of two or more selected among the controllers mounted in the vehicle. For example, the controller 150 may be a vehicle control unit (VCU) or a fuel-cell control unit (FCU) mounted in a fuel cell vehicle. As an exemplary embodiment of the present disclosure, the controller 150 may include the VCU and the FCU.

The controller 150 determines a total system power demand for operating the motor 130 according to a driver's request. The total system power demand is the total power demand distributed by the controller 150 to the plurality of fuel cell stacks 110 forming the fuel cell system.

When the available power output from the fuel cell system is smaller than the total system power demand for operating the motor 130, the battery 140 mounted in the vehicle may be selectively used as an alternative power source.

According to an exemplary embodiment of the present disclosure, the total system power demand is individually distributed to each of the fuel cell stacks, which are selected based on the state thereof, rather than being evenly distributed to all fuel cell stacks 110 in the fuel cell system based on the number of fuel cell stacks 110.

The controller 150 determines the individual power demand for each fuel cell stack 110 based on the condition thereof. The individual power demand is the amount of power demand distributed by the controller 150 to each fuel cell stack 110. The fuel cell stacks 110 in the fuel cell system may generate and output available power, which varies depending on the distributed individual power demand.

Here, a method of distributing power in the fuel cell system before operating the fuel cell stack will be described with reference to FIG. 2.

Figure 2:
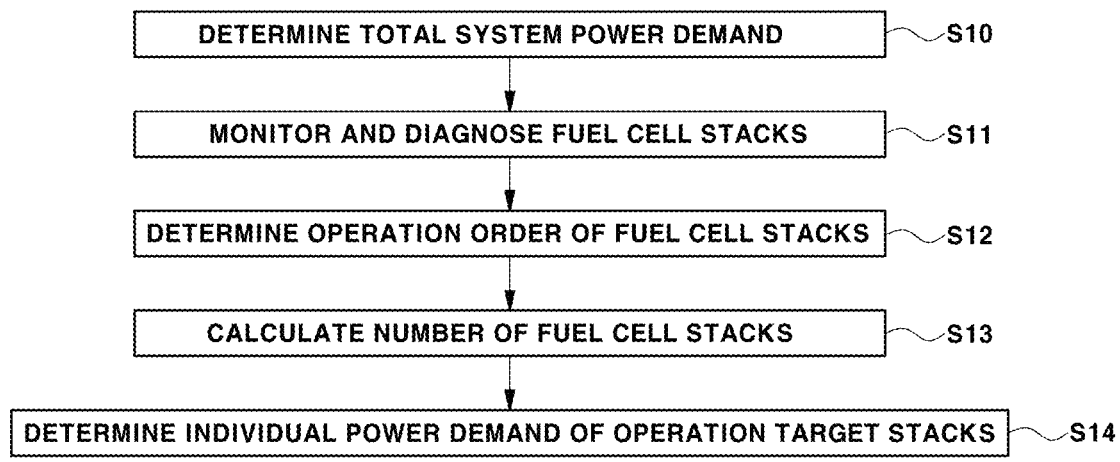
FIG. 2 and FIG. 3 are flowcharts showing a method of distributing power in a fuel cell system according to various exemplary embodiments of the present disclosure.

As shown in FIG. 2, when a driver's request for operation of the motor 130 is detected, the controller 150 calculates and determines the total system power demand for operating the motor 130 in step S10.

To distribute the total system power demand to the fuel cell stacks 110 in the fuel cell system, the controller 150 monitors and diagnoses the state of all the fuel cell stacks 110 in the fuel cell system in real time in step S11.

At least one of the fuel cell stacks 110 in the fuel cell system receives a command from the controller 150 to generate and output available power for operating the motor 130.

The controller 150 may include a hydrogen concentration estimator and a deterioration estimator to monitor and diagnose the state of each fuel cell stack 110. The hydrogen concentration estimator may estimate and determine a hydrogen concentration value of each fuel cell stack 110, and the deterioration estimator may estimate and determine a reversible deterioration value and an irreversible deterioration value of each fuel cell stack 110.

The hydrogen concentration value, the reversible deterioration value, and the irreversible deterioration value are variables affecting on the output performance of the fuel cell stacks 110. The reversible deterioration value is an effective catalyst reaction area ratio of the fuel cell stack, and the irreversible deterioration value is an effective catalyst loading amount ratio of the fuel cell stack.

Because the method of estimating and determining a hydrogen concentration value in a fuel cell stack is a known technique, a detailed description thereof will be omitted. For example, it may be possible to estimate the hydrogen concentration value in the fuel cell stack using the conventional method. Furthermore, it may also be possible to measure the hydrogen concentration value in the fuel cell stack using a sensor.

The controller 150 determines a first weight factor W1 of each fuel cell stack 110 based on the hydrogen concentration value of the same, and determines a second weight factor W2 of each fuel cell stack 110 based on the effective catalyst reaction area ratio value of the same. The first weight factor W1 and the second weight factor W2 are weight factors for determining the operation order of each fuel cell stack 110.

The controller 150 determines the first weight factor W1 to be '1' when the hydrogen concentration value of each fuel cell stack 110 is equal to or greater than a predetermined first concentration value, and determines the first weight factor W1 to be '0' when the hydrogen concentration value of each fuel cell stack 110 is smaller than the first concentration value. For example, the first concentration value may be determined to be 57%.

Furthermore, the controller 150 sets the effective catalyst reaction area ratio of all of the fuel cell stacks 110 in the fuel cell system (hereinafter, referred to as 'total effective catalyst reaction area ratio') to "1", and determines the effective catalyst reaction area ratio of each fuel cell stack 110 in the fuel cell system by normalizing the same.

In other words, the controller 150 calculates and determines the ratio of the effective catalyst reaction area ratio A2 of each fuel cell stack 110 to the total effective catalyst reaction area ratio A1 of the fuel cell system to be the second weight factor W2 of each fuel cell stack 110 (see Equation 1 below).

$$W2=A2/A1 \qquad \text{Equation 1}$$

The effective catalyst reaction area ratio A2 of each fuel cell stack 110 refers to the ratio of the catalyst reaction area to the total catalyst area of the fuel cell stack 110. The catalyst reaction area refers to the area of an electrode catalyst that effectively acts in an electrochemical reaction for generating electricity of the fuel cell stack 110. The catalyst reaction area may be determined based on the minimum cell voltage of the fuel cell stack. The minimum cell voltage is a minimum value among voltage values of unit cells forming the fuel cell stack. The voltage of the unit cells may be measured using a cell voltage sensor. A predetermined value may be used as the total catalyst area of the fuel cell stack 110.

Furthermore, the total effective catalyst reaction area ratio A1 of the fuel cell system is a value obtained by dividing the sum of the catalyst reaction areas of each fuel cell stack 110 by the sum of the total catalyst area of each fuel cell stack 110.

Furthermore, in the case of a fuel cell stack in which irreversible deterioration has occurred, because the catalyst loading is '0' or close to '0', the effective catalyst reaction area ratio A2 of the fuel cell stack in which the irreversible deterioration has occurred may be determined to be '0'.

After determining the total system power demand, the controller 150 calculates and determines the first weight factor W1 and the second weight factor W2 in real time to determine the operation order of each fuel cell stack 110 based on the first and second weight factors in step S12.

The controller 150 determines the operation order of the fuel cell stack 110 in the order from the largest value to the smallest value of the total weight factor, which are values obtained by multiplying the first weight factor W1 by the second weight factor W2 (TW=W1×W2). The greater the total weight factor TW, the controller 150 allocates a higher operation priority to the fuel cell stack, whereas the smaller the total weight factor TW, the controller 150 allocates a lower operation priority to the fuel cell stack The greater the total weight factor TW and the higher the operation priority, the controller 150 determines that the fuel cell stack is in a good condition, and the higher the output performance of the fuel cell stack, the controller 150 determines that the condition of the fuel cell stack is better.

Furthermore, the controller 150 determines the number of fuel cell stacks to be operated (i.e., the number of operation fuel cell stacks) among all the fuel cell stacks 110 based on the total system power demand in step S13.

The controller 150 may determine the number of operation fuel cell stacks to be a minimum integer greater than or equal to a value obtained by dividing the total system power demand by the average available power of the fuel cell stacks 110. For example, when the total system power demand is '9' and the average available power is '3', the number of operation fuel cell stacks is '3'. When the total system power demand is '10' and the average available power is '3', the number of operation fuel cell stacks is '4'.

The controller 150 chooses a fuel cell stack to which the total system power demand is distributed (i.e., an operation target stack) among all the fuel cell stacks 110 based on the number of operation fuel cell stacks and the operation order of the fuel cell stacks 110. The controller 150 determines at least one of the plurality of fuel cell stacks 110 in the fuel cell system to be the operation target stack.

The controller 150 determines which stack is to be operated, based on the number of the operation fuel cell stacks, in order from the fuel cell stack having the highest operation priority. For example, when the number of operation fuel cell stacks is determined to be two, the controller 150 selects and determines the fuel cell stack having the highest operation priority and the fuel cell stack having the next highest operation priority to be operation target fuel cell stacks.

Furthermore, when the number of operation fuel cell stacks is determined to be one, the controller 150 determines the fuel cell stack having the shortest accumulated operation time among all the fuel cell stacks 110 to be an operation target stack, and then distributes the total system power demand to the operation target stack. The accumulated operation time is an operation time accumulated and counted from the time the fuel cell stacks 110 were first started after being mounted in the vehicle.

In other words, when the number of operation fuel cell stacks is one, the controller 150 sets the power demand for the operation target stack to the total system power demand. When the magnitude of power demand for the fuel cell system is relatively small, the number of operation fuel cell stacks may be determined to be one.

Here, the operation target stack is a fuel cell stack in which the hydrogen concentration in the anode of the fuel cell stack is secured to be equal to or greater than the first concentration value and no irreversible deterioration has occurred.

Furthermore, the controller 150 determines individual power demand based on the total system power demand Ptotal and the effective catalyst reaction area ratio of each fuel cell stack included in the operation target stack in step S14. In other words, the determined individual power demand is the amount of power demand distributed to each fuel cell stack included in the operation target stack.

Referring to Equation 2 below, the controller 150 calculates and determines the individual power demand Pn of each fuel cell stack by multiplying the total system power demand Ptotal by a third weight factor W3 of each fuel cell stack.

$$Pn = Ptotal \times W3 \qquad \text{Equation 2}$$

Here, the third weight factor W3 is determined by dividing the effective catalyst reaction area ratio A2 of each fuel cell stack by a total effective catalyst reaction area ratio A3 of an operation target stack (see Equation 3 below). The total effective catalyst reaction area ratio A3 of the operation target stack is determined as a value obtained by dividing the sum of the catalyst reaction areas of each fuel cell stack 110 included in the operation target stack by the sum of the total catalyst area of each fuel cell stack 110 included in the operation target stack.

$$W3 = A2/A3 \qquad \text{Equation 3}$$

Next, a method of distributing power in the fuel cell system after the operation target stack starts operating will be described with reference to FIG. 3.

Figure 3:
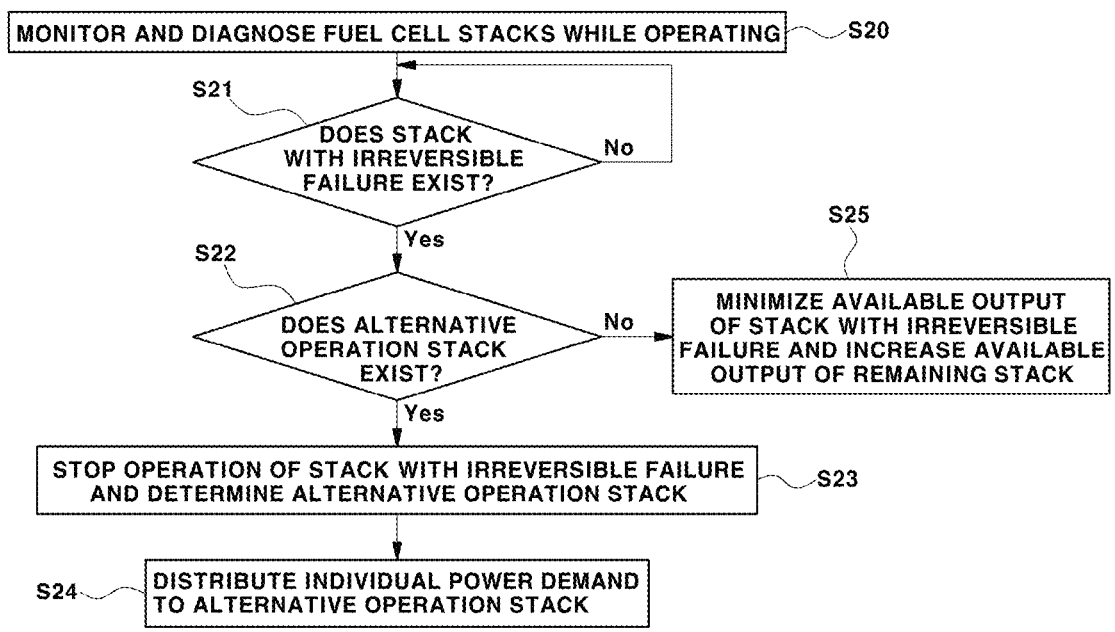

As shown in FIG. 3, the controller 150 monitors and diagnoses the state of the operation target stack in real time after the operation target stack starts operating in step S20.

The controller 150 determines whether there is a fuel cell stack in which an irreversible failure has occurred (i.e., a fuel cell stack with irreversible failure) based on the state of each operation target stack in step S21. A fuel cell stack with irreversible failure is a fuel cell stack in which available power is reduced due to non-heating deterioration.

The controller 150 determines whether there is an alternative stack to be operated instead of the fuel cell stack with the irreversible failure among all the fuel cell stacks 110 in the fuel cell system in step S22, and when there is an alternative operation stack, the controller 150 stops the operation of the fuel cell stack with the irreversible failure.

When the controller 150 determines that a fuel cell stack with irreversible failure is present while the operation target stack is operating, the controller 150 stops the operation of the fuel cell stack with the irreversible failure and determines the fuel cell stack having the highest operation priority among the remaining fuel cell stacks as an alternative operation stack in step S23. Here, the remaining fuel cell stacks are fuel cell stacks excluding the operation target stack among all the fuel cell stacks 110.

When the controller 150 stops the operation of the fuel cell stack with the irreversible failure, the controller 150, to maintain the available output of the fuel cell system, distributes the individual power demand of the fuel cell stack with the irreversible failure to the alternative operation stack to operate the alternative operation stack in step S24. Alternatively, the controller 150 increases the individual power demand of the remaining fuel cell stacks, excluding the fuel cell stack with the irreversible failure, in the operation target fuel cell stacks.

The controller 150 may increase the available power outputted by the remaining fuel cell stacks in real time by increasing the individual power demand of the remaining fuel cell stacks. The controller 150 may increase the available power of the remaining fuel cell stacks to maintain the available output of the fuel cell system the same as before the fuel cell stack with the irreversible failure was found.

Furthermore, when there is no alternative operation stack among all the fuel cell stacks 110 in the fuel cell system, the controller 150 decreases the individual power demand of the fuel cell stack with the irreversible failure to a predetermined minimum power demand. When all of the fuel cell stacks 110 in the fuel cell system are determined to be operation target fuel cell stacks and operated, there is no alternative operation stack to be operated instead of the fuel cell stack with the irreversible failure in the fuel cell system.

When it is determined that a fuel cell stack with irreversible failure is present and there is no alternative operation stack while the operation target stack is operating, the controller 150 reduces the individual power demand of the fuel cell stack with the irreversible failure to a predetermined minimum power demand, and at the same time increases the individual power demand of the remaining fuel cell stack to a predetermined maximum power demand in step S25. The remaining fuel cell stack is a fuel cell stack excluding the fuel cell stack with the irreversible failure from the operation target stack. When the individual power demand of the remaining fuel cell stacks is increased, the available power of the remaining fuel cell stack is increased by following the individual power demand, and as a result, the available output of the fuel cell system may be maintained at the same level as before the fuel cell stack with the irreversible failure was found.

When detecting the presence of the fuel cell stack with the irreversible failure, the controller 150 may output a failure alarm signal to notify a driver of the presence of the fuel cell stack with the irreversible failure to thereby induce the driver to proceed with maintenance of the fuel cell system in the vehicle.

Furthermore, when there are two operation target fuel cell stacks and the total number of fuel cell stacks 110 forming the fuel cell system is also two, and when the controller 150 determines that one of the operation target fuel cell stacks is a fuel cell stack with irreversible failure, the controller 150 is configured to control the operation of the remaining fuel cell stack so that the remaining fuel cell stack outputs a predetermined maximum available power, minimizing the decrease in the available power of the fuel cell system.

When the fuel cell stack with the irreversible failure is continuously operated, permanent damage such as loss of catalyst in the fuel cell stack with the irreversible failure or a hole in the electrolyte membrane in the fuel cell stack with the irreversible failure is more likely to occur.

When the controller 150 recognizes that a fuel cell stack with irreversible failure is present, the controller 150 stops the operation of the fuel cell stack with the irreversible failure or reduces the individual power demand of the fuel cell stack with the irreversible failure to the minimum power demand, preventing further permanent damage to the fuel cell stack with the irreversible failure and reducing the permanent damage to the fuel cell stack with the irreversible failure.

Furthermore, when the operation order is changed in real time according to the state of each fuel cell stack 110, the controller 150 may replace and change the operation target stack based on the changed operation order.

Meanwhile, the controller 150 may determine whether a fuel cell stack with irreversible failure is present based on the effective catalyst loading amount ratio of the fuel cell stack. The effective catalyst loading amount ratio is a value obtained by dividing the actual catalyst loading amount remaining in the electrode of the fuel cell stack by a predetermined initial catalyst loading amount. The initial catalyst loading amount is the catalyst loading amount before catalyst loss occurs in the fuel cell stack. The actual catalyst loading amount may be determined based on the average cell voltage of the fuel cell stack. The average cell voltage is an average voltage value of unit cells forming the fuel cell stack.

Irreversible deterioration of the fuel cell stack is the state in which the output performance decreases due to a decrease in the amount of the electrode catalyst or a hole in the electrolyte membrane.

When the effective catalyst loading amount ratio of the fuel cell stack is less than or equal to a predetermined first loading amount ratio, the controller 150 determines that a failure has occurred due to irreversible deterioration of the fuel cell stack. The first loading amount ratio may be set to a value close to '0'.

As is apparent from the above description, various aspects of the present disclosure are directed to providing the following effect.

The present disclosure may prevent a decrease in the output of a fuel cell system and a decrease in the durability of a fuel cell stack by efficiently distributing the power demand to each of fuel cell stacks according to the state of the fuel cell stacks.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of distributing power in a fuel cell system including a plurality of fuel cell stacks, the method comprising:
    determining, by a controller, a total system power demand, which is a power demand of the fuel cell system;
    determining, by the controller, an operation order of the fuel cell stacks based on a state of the fuel cell stacks;
    determining, by the controller, a number of operation fuel cell stacks, which is a number of fuel cell stacks to be operated, among the plurality of fuel cell stacks, based on the total system power demand and an average available power of the fuel cell stacks;
    determining, by the controller, operation target fuel cell stacks, the operation target fuel cell stacks being fuel cell stacks to which the total system power demand is to be distributed, based on the operation order of the fuel cell stacks and the number of the operation fuel cell stacks; and
    determining, by the controller, a power demand of each of the operation target fuel cell stacks based on the total system power demand and an effective catalyst reaction area ratio of each fuel cell stack included in the operation target fuel cell stacks.

2. The method of claim 1,
    wherein when a fuel cell stack with irreversible failure is found among the plurality of fuel cell stacks while the operation target fuel cell stacks are operating, the controller is configured to stop operation of the fuel cell stack with the irreversible failure and to determine a fuel cell stack including a highest operation priority among remaining fuel cell stacks as an alternative operation stack and to operate the alternative operation stack, and
    wherein the remaining fuel cell stacks are fuel cell stacks other than the operation target fuel cell stacks, among the fuel cell stacks.

3. The method of claim 2, wherein the controller is configured to distribute a power demand of the fuel cell stack with the irreversible failure to the alternative operation fuel cell stack.

4. The method of claim 2, wherein the fuel cell stack with the irreversible failure is a fuel cell stack, having an effective catalyst loading amount ratio equal to or less than a predetermined first loading amount ratio, among the operation target fuel cell stacks.

5. The method of claim 2, wherein when the controller concludes that the fuel cell stack with the irreversible failure is present and there is no alternative operation stack while the operation target stack is operating, the controller is configured to reduce a power demand of the fuel cell stack with the irreversible failure to a predetermined minimum power demand, and to increase a power demand of the remaining fuel cell stacks to a predetermined maximum power demand.

6. The method of claim 1,
    wherein when a fuel cell stack with irreversible failure is found among the plurality of fuel cell stacks while the operation target fuel cell stacks are operating, the controller is configured to stop operation of the fuel cell stack with the irreversible failure and to increase power demand of remaining fuel cell stacks, and
    wherein the remaining fuel cell stacks are fuel cell stacks other than the fuel cell stack with the irreversible failure, among the operation target fuel cell stacks.

7. The method of claim 1,
    wherein when a fuel cell stack with irreversible failure is found among the plurality of fuel cell stacks while the operation target fuel cell stacks are operating, the controller is configured to reduce a power demand of the fuel cell stack with the irreversible failure to a predetermined minimum power demand and to increase power demand of remaining fuel cell stacks to a predetermined maximum power demand, and
    wherein the remaining fuel cell stacks are fuel cell stacks other than the fuel cell stack with the irreversible failure, among the operation target fuel cell stacks.

8. The method of claim 1,
    wherein the controller is configured to determine an operation order of each fuel cell stack based on a first weight factor and a second weight factor,
    wherein the first weight factor is determined based on a hydrogen concentration in each fuel cell stack, and
    wherein the second weight factor is determined as a value obtained by dividing an effective catalyst reaction area ratio of each fuel cell stack by a total effective catalyst reaction area ratio of the fuel cell system.

9. The method of claim 8, wherein the controller is configured to determine the operation order of the fuel cell stacks in an order from a largest value to a smallest value of a total weight factor, the total weight factor being a value obtained by multiplying the first weight factor by the second weight factor.

10. The method of claim 1,
    wherein the controller is configured to determine power demand of the fuel cell stacks included in the operation target fuel cell stacks as a value obtained by multiplying a third weight factor of each fuel cell stack by the total system power demand, and
    wherein the third weight factor is determined as a value obtained by dividing the effective catalyst reaction area ratio of each fuel cell stack included in the operation target fuel cell stacks by a total effective catalyst reaction area ratio of the operation target fuel cell stacks.

11. A fuel cell system comprising:
    a plurality of fuel cell stacks connected to supply power to a motor; and
    a controller configured for:
        determining a total system power demand, which is a power demand of the fuel cell system;
        determining an operation order of the fuel cell stacks based on a state of the fuel cell stacks;
        determining a number of operation fuel cell stacks, which is a number of fuel cell stacks to be operated, among the plurality of fuel cell stacks, based on the total system power demand and an average available power of the fuel cell stacks;

determining operation target fuel cell stacks, the operation target fuel cell stacks being fuel cell stacks to which the total system power demand is to be distributed, based on the operation order of the fuel cell stacks and the number of the operation fuel cell stacks; and determining a power demand of each of the operation target fuel cell stacks based on the total system power demand and an effective catalyst reaction area ratio of each fuel cell stack included in the operation target fuel cell stacks.

12. The fuel cell system of claim 11,
wherein when a fuel cell stack with irreversible failure is found among the plurality of fuel cell stacks while the operation target fuel cell stacks are operating, the controller is configured to stop operation of the fuel cell stack with the irreversible failure and to determine a fuel cell stack including a highest operation priority among remaining fuel cell stacks as an alternative operation stack and to operate the alternative operation stack, and wherein the remaining fuel cell stacks are fuel cell stacks other than the operation target fuel cell stacks, among the fuel cell stacks.

13. The fuel cell system of claim 12, wherein the controller is configured to distribute a power demand of the fuel cell stack with the irreversible failure to the alternative operation fuel cell stack.

14. The fuel cell system of claim 12, wherein the fuel cell stack with the irreversible failure is a fuel cell stack, having an effective catalyst loading amount ratio equal to or less than a predetermined first loading amount ratio, among the operation target fuel cell stacks.

15. The fuel cell system of claim 12, wherein when the controller concludes that the fuel cell stack with the irreversible failure is present and there is no alternative operation stack while the operation target stack is operating, the controller is configured to reduce a power demand of the fuel cell stack with the irreversible failure to a predetermined minimum power demand, and to increase a power demand of the remaining fuel cell stacks to a predetermined maximum power demand.

16. The fuel cell system of claim 11,
wherein when a fuel cell stack with irreversible failure is found among the plurality of fuel cell stacks while the operation target fuel cell stacks are operating, the controller is configured to stop operation of the fuel cell stack with the irreversible failure and to increase power demand of remaining fuel cell stacks, and wherein the remaining fuel cell stacks are fuel cell stacks other than the fuel cell stack with the irreversible failure, among the operation target fuel cell stacks.

17. The fuel cell system of claim 11,
wherein when a fuel cell stack with irreversible failure is found among the plurality of fuel cell stacks while the operation target fuel cell stacks are operating, the controller is configured to reduce a power demand of the fuel cell stack with the irreversible failure to a predetermined minimum power demand and to increase power demand of remaining fuel cell stacks to a predetermined maximum power demand, and wherein the remaining fuel cell stacks are fuel cell stacks other than the fuel cell stack with the irreversible failure, among the operation target fuel cell stacks.

18. The fuel cell system of claim 11,
wherein the controller is configured to determine an operation order of each fuel cell stack based on a first weight factor and a second weight factor, wherein the first weight factor is determined based on a hydrogen concentration in each fuel cell stack, and wherein the second weight factor is determined as a value obtained by dividing an effective catalyst reaction area ratio of each fuel cell stack by a total effective catalyst reaction area ratio of the fuel cell system.

19. The fuel cell system of claim 18, wherein the controller is configured to determine the operation order of the fuel cell stacks in an order from a largest value to a smallest value of a total weight factor, the total weight factor being a value obtained by multiplying the first weight factor by the second weight factor.

20. The fuel cell system of claim 11,
wherein the controller is configured to determine power demand of the fuel cell stacks included in the operation target fuel cell stacks as a value obtained by multiplying a third weight factor of each fuel cell stack by the total system power demand, and wherein the third weight factor is determined as a value obtained by dividing the effective catalyst reaction area ratio of each fuel cell stack included in the operation target fuel cell stacks by a total effective catalyst reaction area ratio of the operation target fuel cell stacks.

* * * * *